April 27, 1943.    A. BOYNTON    2,317,356
BELLOWS TYPE SLUGGING FOOT VALVE FOR WELLS
Filed Nov. 28, 1938    3 Sheets-Sheet 1

ALEXANDER BOYNTON,
INVENTOR,
BY Jesse R. Stone
   Lester B. Clark
ATTORNEY.

April 27, 1943.  A. BOYNTON  2,317,356
BELLOWS TYPE SLUGGING FOOT VALVE FOR WELLS
Filed Nov. 28, 1938  3 Sheets-Sheet 2
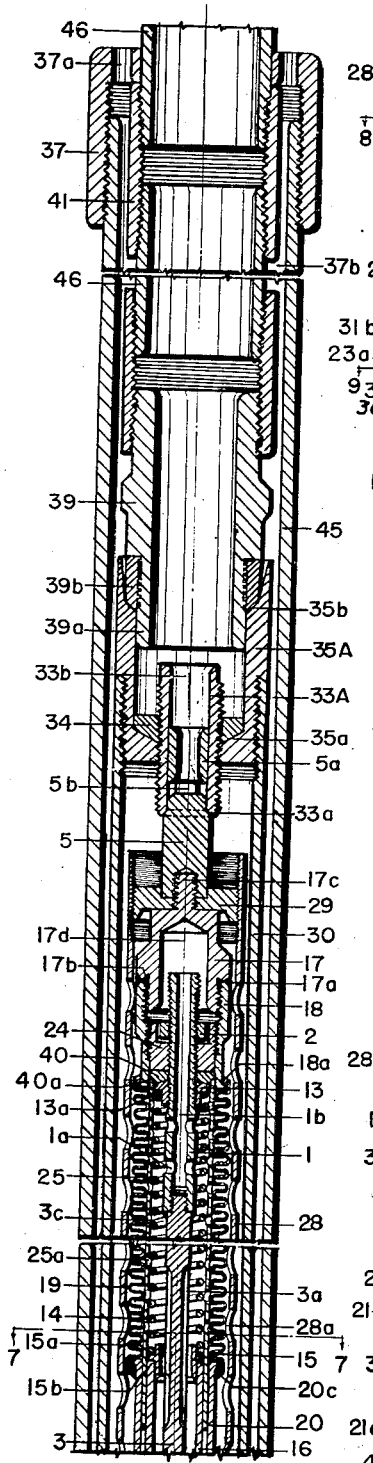
Fig. 4.
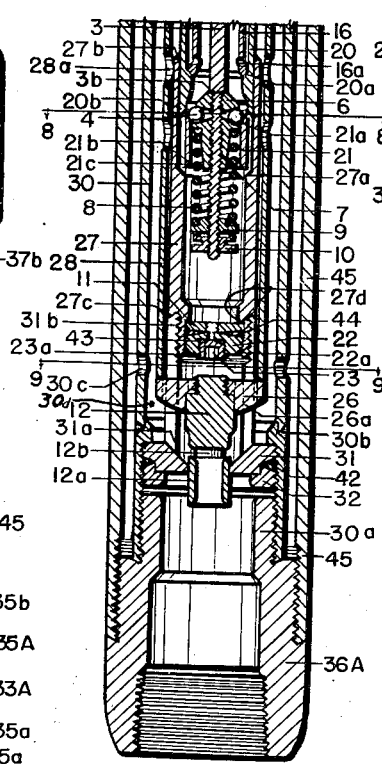
Fig. 5.
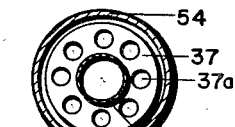
Fig. 6.
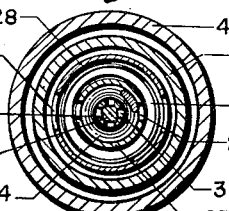
Fig. 7.
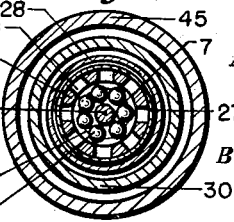
Fig. 8.
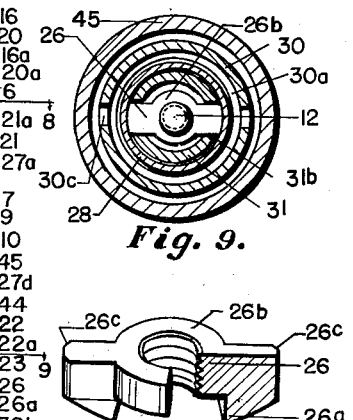
Fig. 9.
Fig. 10.
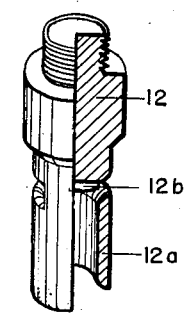
Fig. 11.
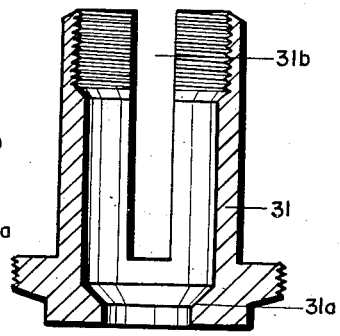
Fig. 12.
ALEXANDER BOYNTON,
INVENTOR,
BY Jesse R. Stone
Lester B. Clark
ATTORNEY.

April 27, 1943.   A. BOYNTON   2,317,356
BELLOWS TYPE SLUGGING FOOT VALVE FOR WELLS
Filed Nov. 28, 1938   3 Sheets-Sheet 3

ALEXANDER BOYNTON,
INVENTOR,
BY Jesse R. Stone
 & Lester B. Clark
ATTORNEYS.

Patented Apr. 27, 1943

2,317,356

UNITED STATES PATENT OFFICE 2,317,356

BELLOWS TYPE SLUGGING FOOT VALVE FOR WELLS

Alexander Boynton, San Antonio, Tex.

Application November 28, 1938, Serial No. 242,770

15 Claims. (Cl. 103—234)

My invention relates to a means for expelling liquids from wells by the force of compressed air or gas acting under a slug of liquid.

One of the objects is to provide a slugging foot valve for well flow tubing whereby slugs of well liquid of different lengths or weights can be automatically expelled by simply varying the air or gas pressure within the well casing exterior of the flow tubing. By increasing the air or gas pressure the length of the slug is decreased, and vice versa.

Unlike the other inventions disclosed in my patents numbered 2,042,583, 2,010,135, 2,006,909 and 1,968,633 this invention allows the air or gas pressure used to operate the device to contact the producing formations of the well. The ultimate recovery from almost any oil well would be increased by holding a certain pressure upon the producing formation. This device may be adjusted to operate under a wide range of pressures within a well.

The use of clock timing devices to operate the machinery to flow the accumulated liquid from a well at predetermined intervals is avoided by this device which uses the weight of the accumulated well liquid to open the foot valve and cause the well to flow by the force of the compressed air or gas in the well casing exterior of the flow tubing. In adjusting the flowing intervals to the production by weighing the liquid as it comes into the well, I accomplish directly and positively the purpose that other timing devices accomplish by indirection. Errors in well production data become harmless. This statement is made clear by assuming that a given well should be flowed as often as it will produce one barrel of oil which is estimated to accumulate in the well each two hours.

If a timing device (of which there are many) be then installed to flow the well every two hours, and the production of two hours should be in fact only one-half barrel, the improper flowing interval will continue until the error is discovered and the timing device reset to the proper time interval; whereas with this invention the device waits for the barrel of oil to enter the well whether the time interval be ten minutes or ten hours whereupon the contents of the well will be discharged. In this invention the time interval between slugs expelled from the well may be changed by merely changing the air or gas pressure, as stated, used to expel the slugs.

A slug measure is used to measure each slug, thereby enabling the ratio between the weight of the slug and the lifting force to be exactly determined before the installation is made.

The foregoing and other advantages will more clearly appear from the following specification and drawings in which:

Fig. 4 is a vertical section of the upper portion of a modified form of the invention.

Fig. 5 is a vertical section of the lower portion of a modified form of the invention completing the device partially shown in Fig. 4.

Fig. 6 is a horizontal section on the line 6—6, Figs. 1 and 13.

Fig. 7 is a horizontal section on the line 7—7, Fig. 4.

Fig. 8 is a horizontal section on the line 8—8, Fig. 5.

Fig. 9 is a horizontal section on the line 9—9, Fig. 5.

Fig. 10 is a view partly in perspective and partly in longitudinal section of the part 26 in Figs. 3 and 5.

Fig. 11 is a view partly in perspective and partly in longitudinal section of the part 12 in Figs. 3 and 5.

Fig. 12 is a vertical section of the part 31 in Figs. 3 and 5.

Corresponding characters are employed throughout the drawings to indicate and refer to corresponding parts.

Similar but somewhat different parts in figures illustrating modifications of the invention are designated by adding capital A to the first modification, capital B to the second modification, capital C to the third modification, and so on, to the number used to designate the similar part in the preferred form. Different portions of the same part are referred to by adding a, b, c, and so on (small letters), to the number employed to designate the part as a whole.

Figures 1, 2, 3:
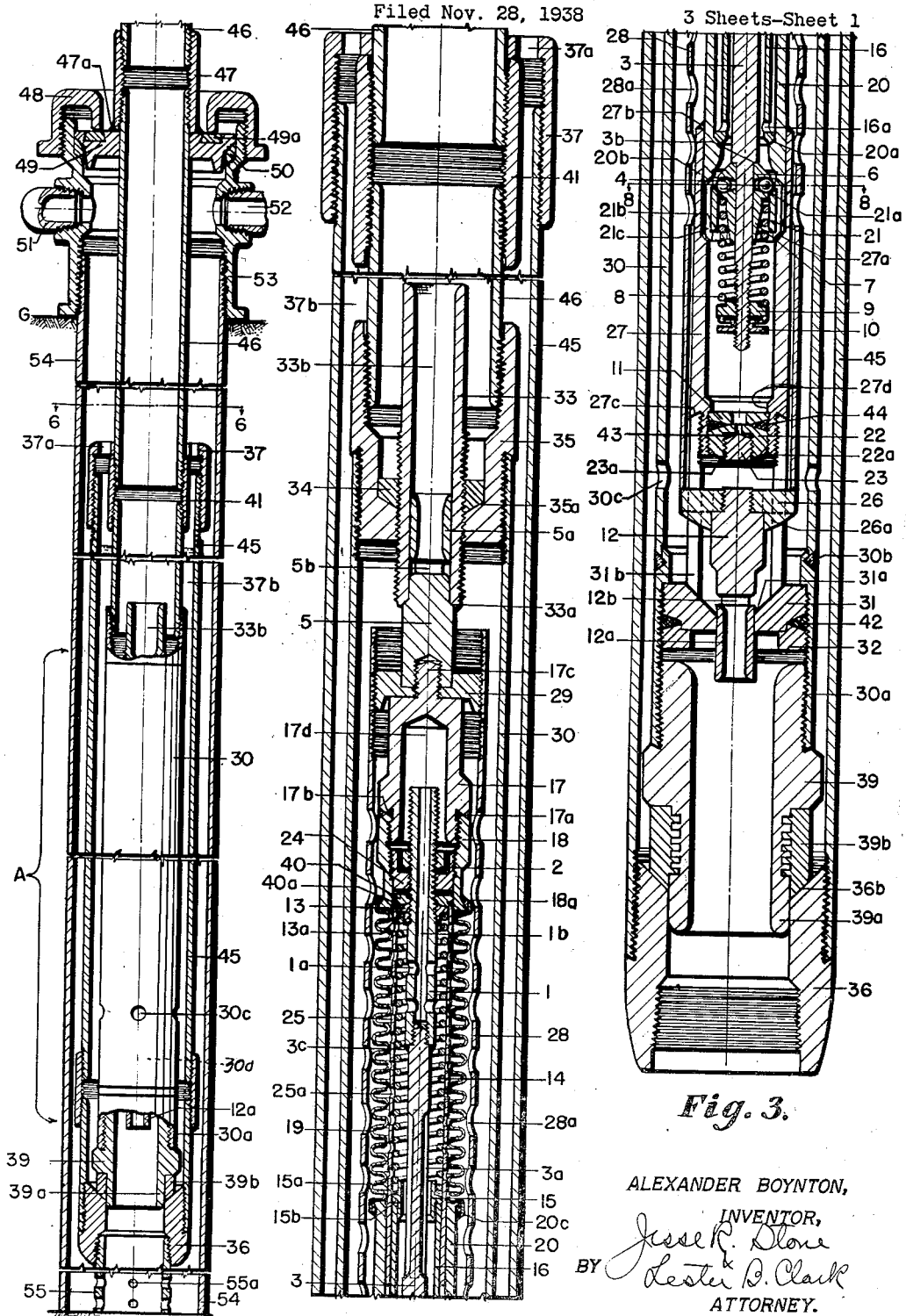
Fig. 1 is a vertical section of a well equipped with this device.
Fig. 2 is a vertical section of the upper portion of the preferred form of this invention.
Fig. 3 is a vertical section of the lower portion of the preferred form of this invention completing the device partially shown in Fig. 2.

Fig. 1 shows a well equipped with this device in which outer casing 54 is sealed above ground surface G by casing head 53 having two openings one of which is closed by bull plug 51, the other being connected with a pipe line 52 for the purpose of conveying compressed air or gas to the well. The eduction tube 46 is suspended centrally within casing 54 and proximate its upper end a coupling 47 of the eduction tubing string rests upon a plate 48 to which it may be welded as shown at 47a or otherwise joined in leakproof contact therewith. Cap 48 is then screwed down upon lead ring 49a poured in place, at the same time compressing lead ring 50, to form a seal against the escape of compressed air or gas confined in the well within the annular space between tubing 46 and casing 54. Any other casing head arrangement that will afford a seal between the well casing and the flow tubing may be used; many such casing heads being well known to the art.

Figure 13:
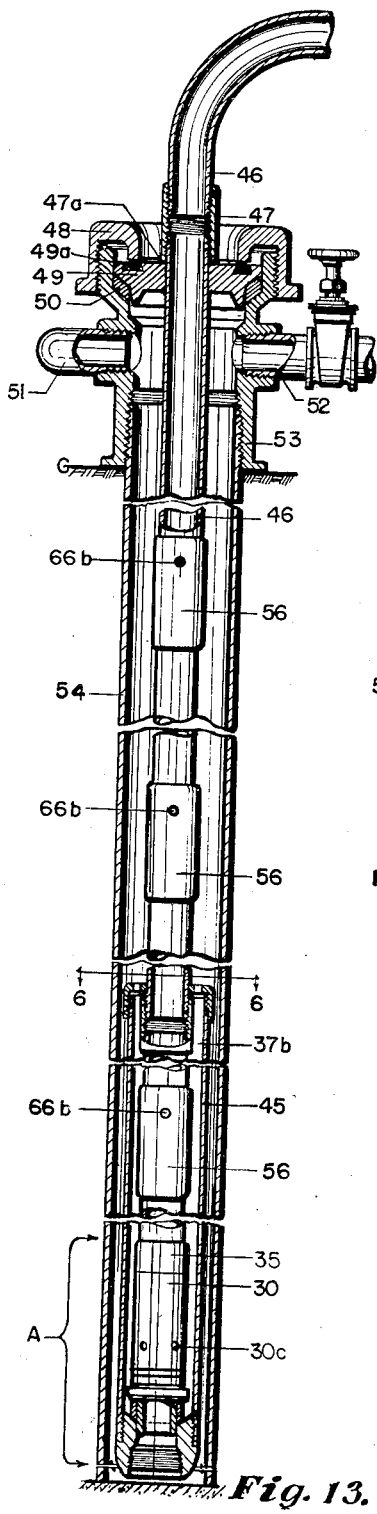
Fig. 13 is a vertical section of a well equipped with this device showing stage lifts in the flow tubing and without anchor tubing.
Figure 14:
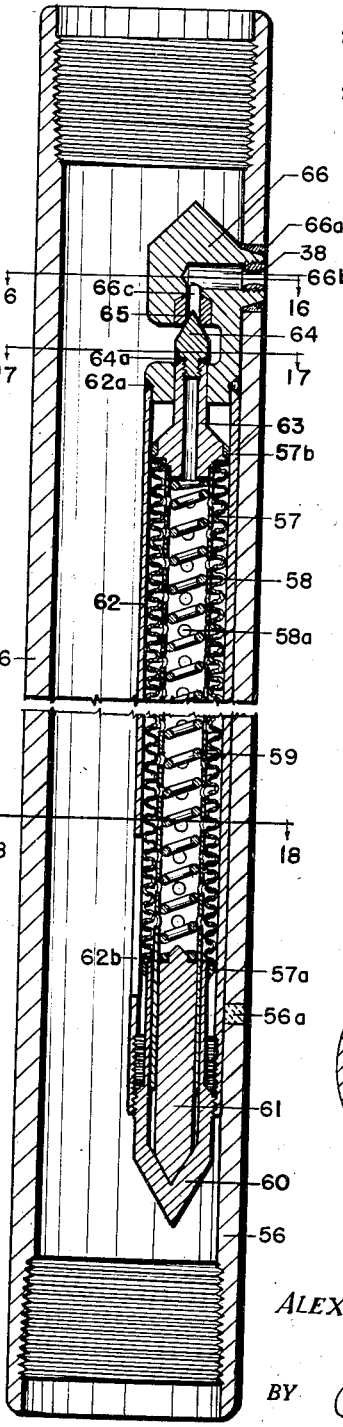
Fig. 14 is a vertical section of the stage lift shown installed at 56 in Fig. 13.

The device shown in Figs. 2 and 3 or the modification shown in Figs. 4 and 5 may be installed within the bracketed space A, Fig. 1. The device may be allowed to hang from the casing head, tubing extension 55 being omitted, or tubing extension 55 may be extended to bottom of the well, perforations 55a being provided to allow ingress of well liquid to the device. Stage lifts 56 (Fig. 14), preferably of the type shown in my copending application Serial No. 242,771 may be installed at intervals in the eduction tube 46 as shown in Fig. 13.

With particular reference to the device shown in Figs. 2 and 3, the flow tubing 46 and slug measure 45 are held in leakproof contact at the lower end of the slug measure by the downward force of cap 37 the horizontal circular flange of which presses down on the upper end of coupling 41 of the flow tubing string by force of the threaded engagement between cap 37 and the upper end of slug measure 45 which presses the lead seal 39b upon seat 36b of anchor tubing reducer 36. The weight of the flow tubing is an additional force tending to produce an hermetical seal between the lead seal 39b and its seat if the weight of the tubing is allowed to rest on the bottom of the well by use of the extension 55. The lead seal which is preferably poured in place is guided upon its seat by extension 39a. The enlarged diameter above the lead seal of carrier nipple 39 is to guide the device central of the slug measure and at the same time prevent the lead seal from contacting and being damaged by the inner wall of the slug measure as the device is being lowered into the position shown in Fig. 1.

The installation is accomplished by first inserting the slug measure string of tubing into the well casing and suspending it temporarily in the casing head while the device and that part of the flow tubing which resides within the slug measure is being screwed together and inserted into said slug measure. When the device is thus assembled and the lead seal 39b is engaged on seat member 36b it will generally be found necessary to cut and thread the last joint of flow tubing required to reach the top of the slug measure in order to place coupling 41 at the proper level to engage the flange of cap 37.

Only the lower thread or two of this cap should engage the upper threads of the slug measure when the flange contacts the upper end of coupling 41, thus allowing that approximately the full length of the threads within cap 37 may be used to compress the flow tubing within the slug measure in order to force the lead seal into leakproof contact with its seat 36b. The slug measure and contained portion of the flow tubing being put together and made into a unit by screwing down cap 37, the remainder of flow tubing 46, being that portion of the tubing string above the slug measure, is then screwed together and the assembly lowered into the well.

Whenever it is found necessary to remove the device, the flow tubing is withdrawn until cap 37 is raised above the casing head. The slug measure is secured upon the casing head by slips or elevators and cap 37 is removed. The remainder of the flow tubing with the device on bottom end thereof may then be withdrawn. This means of enabling the device to be withdrawn from the well and removed from the slug measure without requiring that the slug measure be also removed from the well and the means of producing a seal between these members at the lower end of the slug measure constitutes an important advantage in practical operation.

Case 30 and its lower end 30a are joined together by weld 30b as a manufacturing convenience to avoid the large and expensive counterbore that would otherwise be necessary to obtain the larger internal diameter throughout the length of case 30. Flow tubing connection 35 externally joined by threads to the upper end of case 30 and internally joined by threads to the flow tubing has a central opening threadedly connecting with air or gas valve seat nipple 33 which may be adjusted up or down by means of its considerable length of external threads, as is apparent, and locked in proper position by lock ring 34 engaging upon shoulder 35a. A central opening 33b provides a working fit for the reduced diameter portion 5a of fluid outlet valve 5. A seat 33a is provided in the lower end of nipple 33 to normally engage valve 5 as shown, this valve having threaded connection with an upper extension 17c of the valve connection 17. A central opening through adjusting plug 29 fits over the extension 17c. By referring to Figs. 2 and 3 it will be seen that the threaded connection between members 5 and 17 is thus made to lock the plug 29 between them. By this union the valve carrier sleeve 28 which has threaded connection with the plug 29 joins the air or gas valve 5 and a lower liquid intake valve 12 rigidly together through the valve carrier 26 which has threaded connection within its annular portion 26b with the liquid intake valve 12 as seen in Figs. 9 and 10. It should be noted that the member 26 is welded at its arm ends 26c into slots in the lower end of sleeve 28. The lower side of member 26 is tapered downwardly to form a wedge shaped portion 26a serving to minimize resistance to the passage of well liquid. When the valve 12 is moved downwardly it seats upon a seat 31a of the bellows base holder 31, the lower end of which has a threaded engagement with the lower portion 30a of the case 30 into which it is locked by the ring 32 which closes upon packing 42 used to prevent a leak of well liquid along the threads engaging between members 30a, 31, and 32.

Member 31, Fig. 12, has an upward cylindrical extension cut by longitudinal slots 31b into which slots fit the two arms of valve carrier 26, Fig. 10, the upper end being internally threaded to engage the lower end of member 27. The inclined shoulder 27c engaging with an upward taper on the upper end of member 31 causes the slotted upper extension of this member to be driven inward thereby providing for a secure threaded engagement between these members.

A bellows bottom connection 20 is pressed into the upper end of the member 27, and an arc ring member 21 is locked between the circularly beveled end 20b and the shoulder 27a as appears in Figs. 3 and 5. Weld or solder 27b secures and hermetically seals the engagement between these members. Weld or solder 20c provides a leakproof connection between the lower end of bellows 19 and member 20 and weld or solder 18a provides a similar connection between the upper end of the bellows and its top connection 18, the upper internal threads of which engage connection 17. Packing 17b and weld or solder 17a hermetically seal the joinder of these members. A chamber 17d is provided in the connecting member 17 so that latch adjusting sub 1 may be raised in making latch adjustments. This sub has threaded connection within the central opening through the lower end of member 24, lock nut 2 being used to secure the position of sub 1 in its engagement within plug 24.

A latch shaft 3 is threadedly connected to sub 1, the connection being secured by weld or solder 3c. A shoulder 3b toward the lower end of said latch shaft provides a landing for a ball roof 6, the central bore through which closely receives the lower reduced diameter portion of shaft 3 over which the central bore through ball floor 7 provides a working fit. Latch balls 4 are held between members 6 and 7 by the expansive force of an adjusting spring 8, always installed below said member 7 under some compression. It will be noted that the adjacent surfaces of ball roof and floor are beveled so as to urge balls 4 outward in response to the expansive force of spring 8 the desired compression of which is accomplished by nut 9 locked in place by lock nut 10 both of which nuts have threaded engagement upon the lower end of shaft 3. A guide pipe 25, preferably polished inside and outside, has an easy working fit within bellows 19 and over the spring 14. Perforations 25a in the guide pipe provide for free circulation of a lubricant. The upper end of this guide pipe is pressed over the lower reduced portion of cap 40 to which it is fastened by weld or solder 40a. The lower end of the guide pipe has a working fit over guide 16 having passages 16a at its lower end. This guide lands at its lower end upon an internal shoulder 20a and at its upper end supports spring bottom shoe 15 at a circular shoulder 15b, the flanged portion of which shoe likewise has a sliding fit within guide pipe 25. Spring upper shoe 13 has a circular shoulder 13a upon which the upper end of spring 14 lands, a similar landing being provided by shoulder 15a at the lower end of this spring which is always installed under some compression in order to supply necessary resistance to the longitudinal compression of bellows 19 when the air or gas valve 5 opens and manifestly at the same time to supply the expansive force necessary to elongate the bellows in the reverse movement thereof when the liquid intake valve 12 opens.

Figure 15:
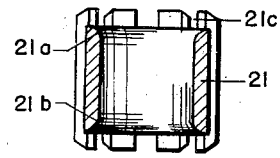
Fig. 15 is a vertical section of the part 21 in Figs. 3 and 5.
Figure 16:
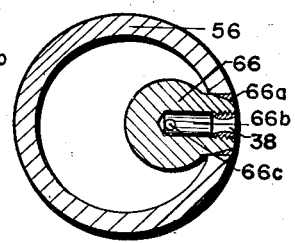
Fig. 16 is a horizontal section on the line 16—16, Fig. 14.
Figure 17:
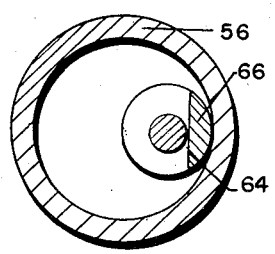
Fig. 17 is a horizontal section on the line 17—17, Fig. 14.
Figure 18:
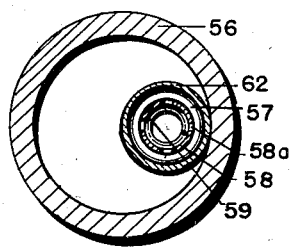
Fig. 18 is a horizontal section on the line 18—18, Fig. 14.

The latch shaft 3 should be so adjusted by means of the threads on upper end of sub 1 that the latch balls 4 will roll slightly over and engage upon the upper end 21a of the arc ring 21, see Fig. 15, when fluid outlet valve 5 is closed and the liquid intake valve is open as shown in Fig. 2. The latch balls should roll slightly under and engage upon the lower end 21b of the arc ring when the liquid intake valve is closed and the fluid outlet valve is open. It will be noted that the length of arc ring 21 is such as will allow the latch balls to roll slightly over the curved surfaces 21a and 21b as the valves alternately assume extreme upper and lower positions. Manifestly the further the latch balls roll outward upon the curved surface 21a the more resistance will be offered by the latch to the opening of air or gas valve 5 and the closing of the liquid intake valve 12; and likewise the further the latch balls roll outward under curved surface 21b the more resistance will be offered by the latch to closing of the air or gas valve and the opening of the liquid intake valve 12. The latch should be so adjusted as to afford snap valve action in both directions, it being desired that both valves should open and close with a slam. Increasing the compression on adjusting spring 8 causes the latch to hold with greater force at a given travel of latch balls over surfaces 21a and 21b, and vice versa. It should be remembered that both valves are rigidly mounted upon valve carrier sleeve 28, as heretofore stated, and that these valves move as a unit, one opening as and when the other closes.

A lubricant should be placed within the latch chamber formed by the bellows and its end connections. An air pocket or vacuum space should be left above this lubricant, the space being enough to allow the liquid intake valve to close just before the roof of chamber 17d would impinge upon the lubricant. This provides that the remainder of this space will be closed upon by the outward compression of the bellows corrugations as the folds are forced together by external pressure. In this manner the external and internal pressures are kept equal except for the force required to compress spring 14 and the bellows corrugations. The bellows will, therefore, never be ruptured by any external force no matter how great so long as the force required to compress spring 14 is less than the force necessary to rupture the bellows. Vertical passage 1b, horizontal openings 1a, slots 3a, and slots 21c provide for the free circulation of the latch lubricant without which provision the latch operation would be impeded.

It is necessary that the bellows chamber be hermetically sealed in order to keep the bellows responsive to varying external pressures tending to shorten under relatively high pressures and to lengthen under relatively low pressures. The other places where the bellows chamber is hermetically sealed by packing, welding, or soldering having been previously noted, it will now be observed that plate 11 is stopped by shoulder 27d from upward movement. Packing 44 is compressed between the plate 11 and plug 22 as this plug is screwed in. Weld or solder 22a may be used in completing the closure between this plug and the member 27. An axial opening through the plug 22 is closed by the seal plug 23 compressing the packing 43 and further sealed by solder 23a. If through a leak in any of the welds or solders sealing the bellows there should be open communication between the interior and exterior of the bellows the pressure will equalize within and without the bellows, which equalization will, of course, render the bellows inoperative.

It will be noted that my device operates within a chamber 30d within the case 30, the upper wall of which is formed by the tubing connection 35 and the lower end of which is closed by the base 31. The fluid inlet valve 12 controls the inlet through said base 31, while the valve 5 controls the passage 33b through the upper tubing connection. Both valves are controlled simultaneously by the bellows and spring assembly, as has been described. The said chamber has a lateral opening also at 30c to admit the operating fluid employed in lifting the liquid from the well as will now be explained.

The operation of the device will be explained by assuming the construction shown in Figs. 2 and 3 to be installed within the bracketed space A, Fig. 1. The well is assumed to be "pumped off." It will be further assumed that the fluid outlet valve 5 is set to open and the liquid intake valve 12 to close at an external pressure of 125 lbs. per sq. in., that 100 lbs. per sq. in. of air or gas pressure is within the well casing exterior of the flow tubing, and that the air or gas valve will again close, and the liquid intake valve open at 95 lbs. external pressure. Well liquid now begins to rise in the well. The liquid enters the annular space exterior of the flow tubing in slug measure 45 via the central vertical passage through lower extension 12a of liquid intake valve 12, ports 12b, and perforations 30c. When the well liquid rises high enough to exert an additional 25 lbs. per sq. in. upon the bellows which may be two barrels in the measuring tube, the pressure transmitted through perforations 28a will act upon the bellows to compress it and spring the latch at 21, thus opening the fluid outlet valve 5 and closing the liquid intake valve 12. Here it should be remembered that the latch is adjusted to slam valve 12 closed when valve 5 opens. The air or gas in the well casing entering the slug measure through passages 37a forces the slug back in the annular space 37b and through openings 30c, through the annular space between sleeve 28 and case 30, through ports 5b (now open below the lower end of nipple 33) and into the flow tubing 46 via the vertical openings through extension 5a and nipple 33.

If the annular space 37b in the slug measure exterior of the flow tubing equals twice the space of an equal length within the flow tubing the slug expelled will weigh 50 lbs. per sq. in.; or if this annular space equals slightly less than four times the space within an equal length of the flow tubing the slug to be expelled will exert a back pressure of slightly less than 100 lbs. per sq. in. The pressure within the slug measure will quickly drop to the predetermined 95 lbs. required to again close fluid outlet valve and open the liquid intake valve before the slug is entirely expelled from the tubing if the slug weighs nearly as much as the air or gas will lift. If the slug is much lighter (due to the ratio between capacities of equal lengths of slug measure and flow tubing) than the air or gas pressure used to lift the slug, the fluid outlet valve will close before the slug reaches the ground surface but in such case the air or gas under the slug will continue to expand and accomplish the slug expulsion.

Increasing the air or gas pressure will shorten the slug, and vice versa, because the higher the air or gas pressure is the less well liquid will be required to augment it enough to exert the assumed 125 lbs. external pressure required to open the fluid outlet valve and close the liquid intake valve.

The primary purpose of the slug measure is to establish a definite ratio between the cubical contents of the annular space 37b within the slug measure exterior of the flow tubing and the cubical contents of an equal length of flow tubing. Without a slug measure, caves, shot holes, and the like in wells slightly above the level of the device will sometimes interfere with satisfactory operation by permitting more well liquid to accumulate therein than can be reformed into a slug that the desired air or gas pressure will expel from the flow tubing. My copending application S. N. 242,771, patented March 10, 1942, No. 2,275,416, describes a similar device to the one here disclosed using no slug measure attached to the flow tubing, the slug in said copending application being measured in the space between the flow tubing and the wall of the well or between the flow tubing and the well liner or casing as the particular well condition may provide.

The modified form of this invention shown in Figs. 4 and 5 is so similar to the preferred form shown in Figs. 2 and 3, both in construction and operation, that it will be necessary only to note that the lead seal lands upon the member 35A immediately above the device which at its lower end is threadedly connected to member 36A and is consequently left in the slug measure tubing when the flow tubing is withdrawn therefrom. The valve seat nipple 33A in Fig. 4 corresponds to the similar nipple 33 in Fig. 2.

Fig. 13 is an installation plan which shows that either of the foregoing devices may be installed within the bracketed space A with stage lifts 56 installed at intervals in the flow tubing in order to "pump the well off" down to the working level of the slugging foot valve without employing much higher air or gas pressure to start the well flowing than would be required to operate the slugging foot valve and only a part of the pressure that would be required to start the well without stage lifts. The form of stage lift shown in Figs. 14, 16, 17, and 18 will be found satisfactory for the purpose stated and is briefly described as consisting of case coupling 56 into a lateral opening of which an extension of an intake housing 66, is welded at 66a, case 62 being welded to case coupling 56 at 56a and again welded to member 66 at 62a. A bellows top end connection 63 is soldered to the bellows 57 at 57b. Valve 64 is screwed into the top end of the member 63 and soldered at 64a, and the bellows bottom end connection 60 is soldered to the bellows at 57a, hermetically sealing with the interior of the bellows. A guide plug 61 and spring 59 have a working fit within a guide pipe 58 at the lower end thereof, the exterior of said pipe being somewhat smaller than the interior diameter of the bellows.

The valve 64 is held against the seat 65 by the expansive force of spring 59. An air pocket or vacuum space is provided above a lubricant with which the bellows is partly filled, and perforations 58a provide that the lubricant may circulate responsive to the bellows movement. When the liquid pressure acting on the bellows through slot 62b in the wall of the case causes it to contract and unseat valve 64 the air or gas in the well casing enters the flow tubing via openings through bushing 38, passages 66b, 66c, and the opening through valve seat member 65 as is apparent in Fig. 14.

The bellows assembly should be adjusted to open valve 64 when the weight of the upstanding liquid column forced into the flow tubing by the air or gas pressure exterior thereof in the casing is somewhat greater than the force required to operate the slugging foot valve. Such adjustment provides that the slugs of the slugging foot valve will not cause the stages to open after the foot valve begins to operate. The stages should remain inoperative except to pump the well down to the level at which the foot valve operates.

The external pressure at which the bellows will contract may be regulated by screwing connection 60 upward to increase this pressure or downward to decrease this pressure. If the limits of such adjustment do not permit obtaining the desired setting a stronger or weaker spring may be placed within the bellows as may be required. A stronger spring equal in length to the one removed will cause the bellows to contract and open the valve at a greater external pressure. Any spring exerting more expansive force within the bellows whether the spring be longer or shorter than the one removed will accomplish this purpose. Corollary to this, the external force required to open the valve will be reduced if a spring of less force be used.

It is understood that the details of construction and arrangement of parts are subject to many obvious variations and minor changes without departing from the scope and purpose of my invention as defined by the appended claims.

I claim:

1. A well flowing device including, a casing, an eduction tube therein, a slug measuring pipe spaced outside said tube and extending upwardly from the lower end of said tube a predetermined distance, means sealing between the lower ends of said tube and said pipe, a fluid passage to said tube above its lower end, a chamber in said tube, an upper outlet therefrom to said tube, a valve normally closing said outlet, a lower inlet to said chamber to admit well liquid to the chamber, a valve in said inlet, means connected with said valves to open said outlet and simultaneously close said inlet, in response to a predetermined fluid pressure in said chamber, and means to conduct fluid under pressure into said casing and said measuring pipe, there being an opening between said measuring pipe and said chamber.

2. A well flowing device including, a casing, an eduction tube therein, a slug measuring pipe spaced outside said tube and extending upwardly from the lower end of said tube a predetermined distance, means sealing between the lower ends of said tubing and said pipe, a fluid passage to said tube above its lower end, a chamber in said tube, an upper outlet from said chamber to said tube, a vertically adjustable valve seat in said outlet, a valve normally closing said seat, a lower inlet to said chamber to admit well liquid to the chamber, a valve normally open in said inlet, means connected with said valves to open said outlet and simultaneously close said inlet, in response to a predetermined fluid pressure in said chamber, and means to conduct fluid under pressure into said casing and said measuring pipe, there being an opening between said measuring pipe and said chamber.

3. An eduction tube for wells, a slug measuring pipe connected with the lower end of said tube and extending upwardly a suitable distance in spaced relation outside said tube, a chamber adjacent the lower end of said tube, a fluid inlet at the lower end of said chamber to admit well liquid to the chamber, an outlet at the upper end thereof to said tube, valves for said inlet and outlet, one of which valves is normally open and the other closed, said chamber having an opening to said measuring pipe adjacent its lower end, means to close said open valve and open said closed valve, said tube being imperforate except for openings therein adjacent the lower end thereof.

4. An eduction tube for wells, a slug measuring pipe connected with the lower end of said tube and spaced therefrom, a chamber in the lower portion of said tube, a lower inlet to said chamber and an upper outlet from said chamber to said tube for passage of well liquid to and from the chamber, valves at said inlet and said outlet, means connecting said valves together, means supported in said tube to move said valves simultaneously to open one and close the other responsive to fluid pressure in said chamber, a lateral inlet for pressure fluid to said chamber and means to conduct pressure fluid into said measuring tube and to said lateral inlet.

5. An eduction tube for wells, a slug measuring pipe connected with the lower end of said tube and spaced therefrom, a chamber in the lower portion of said tube, a lower inlet to said chamber and an upper outlet from said chamber to said tube for passage of well liquid to and from the chamber, valves at said inlet and said outlet, a tubular member connecting said valves rigidly together, means in said tubular member and supported in said chamber to move said valves to open one and close the other responsive to predetermined fluid pressures in said chamber, and a passage for pressure fluid into said pipe and to the lower end of the said chamber.

6. An eduction tube for wells, a chamber in said tube adjacent its lower end, a lower inlet for well liquid to said chamber and an upper outlet in said chamber for passage of fluids to said tube, a valve in said inlet, a valve in said outlet, a member connecting said valves, said member being shorter than the distance between said inlet and said outlet, whereby one valve will be open when the other is closed, means holding said outlet valve normally closed, an inlet for pressure fluid to said chamber, and means responsive to fluid pressure in said chamber to open said outlet and close said inlet.

7. In combination an eduction tube for wells, a chamber in said tube adjacent its lower end, a lower inlet for well liquid to said chamber and an upper outlet in said chamber to said tube, a valve in said inlet, a valve in said outlet, a member connecting said valves, said member being shorter than the distance between said inlet and said outlet, whereby one valve will be open when the other is closed, each of said valves including a tubular portion adapted to slidably pass through the inlet and outlet respectively to guide the valve assembly, means holding said outlet valve normally closed, means responsive to fluid pressure in said chamber to open said outlet and close said inlet.

8. A well casing, an eduction tube therein, a slug measuring pipe adjacent the lower end of said casing, a seat in said pipe, a sealing member at the lower end of said tube engaging in said seat, a compartment for liquid between said tube and said pipe, a chamber in said tube below the upper end of said pipe, a lower inlet to said chamber and an upper outlet in said chamber to said tube, a fluid passage between said chamber and said compartment, valves at said inlet and outlet, means responsive to fluid pressure to move said valves to open said outlet and close said inlet, there being a passage from within said pipe to the interior of said chamber so that pressure fluid enters through said pipe to actuate said last mentioned means and to lift the liquid into and through the eduction tube.

9. A well casing, an eduction tube therein, a slug measuring pipe adjacent the lower end of said casing, a seat in said pipe, a sealing member at the lower end of said tube engaging in said seat, a compartment for liquid between said tube and said pipe, a chamber in said tube below the upper end of said pipe, a lower inlet for admitting well liquid to said chamber and an upper outlet in said chamber to said tube, a valve at said inlet, a valve at said outlet, means connecting said valves together, means normally holding said inlet valve open and said outlet valve closed, means to open said outlet valve and close said inlet valve when the liquid level reaches a predetermined height in said pipe, and means to conduct pressure fluid through said pipe into said chamber to lift the liquid above said inlet.

10. A well casing, an eduction tube therein, a slug measuring pipe adjacent the lower end of said casing, a seat in said pipe, a sealing member at the lower end of said tube engaging in said seat, a compartment for liquid between said tube and said pipe, a chamber in said tube below the upper end of said pipe, a lower inlet for admitting well liquid to said chamber and an upper outlet in said chamber to said tube, a fluid passage between said chamber and said compartment, valves at said inlet and outlet, means responsive to fluid pressure to move said valves to open said outlet and close said inlet, means to latch said valves resiliently in both open and closed positions, means to adjust the distance between said valves, and means to thereafter conduct pressure fluid into said pipe and to said chamber to lift the liquid therein.

11. A well casing, an eduction tube therein, a slug measuring pipe around said tube and extending upward a predetermined distance from the lower end of said tube so as to form an annular slug measure between said pipe and tube, a cap upon the upper end of said pipe, said cap having an internal annular flange engageable upon a coupling of said tube to support said pipe, there being a pressure fluid inlet between the well casing and the interior of the slug measuring pipe, pressure fluid in said casing, sealing means between said pipe and tube at the lower end of said tube, a first plate in said tube proximately above said sealing means, an annular opening in said plate, a valve seat surrounding the upper end of said opening, a second plate in said tube above said first plate and in spaced relation thereto, an adjustable valve seat nipple in an axial opening of said second plate, a valve seat upon the lower end of said valve seat nipple, a chamber between said plates, a hermetically sealed bellows in said chamber, said bellows being pressure responsive and having upper and lower end connections, the lower end connection being secured upon an upward extension of said first plate, a valve carrier sleeve surrounding said bellows and adjustably secured to the bellows upper end connection, a valve upon said upper end connection to control the flow of well liquid and pressure fluid from the slug measure into sad tube, said valve being normally closed upon the valve seat of said nipple, a valve upon the lower end of said sleeve to control the flow of well liquid from the exterior of said pipe to the interior thereof, said valve being normally open and adapted to engage the valve seat upon said first plate when a predetermined pressure upon the external surface of said bellows compresses the same, said bellows containing a latch and a lubricant, said latch being constructed and arranged to delay and provide snap action for the movements of said valves and said lubricant being adapted to lubricate said latch and limit the compression of said bellows.

12. A well casing, an eduction tube therein, a slug measuring pipe around said tube and extending upward a predetermined distance from the lower end of said tube so as to form an annular slug measure between said pipe and tube, a cap upon the upper end of said pipe, said cap having an internal annular flange engageable upon a coupling of said tube to support said pipe, there being a pressure fluid inlet between the well casing and the interior of the annular slug measure, a pressure fluid in said casing, a case nipple connected within the lower end of said pipe, a first plate transverse of said case nipple and proximate the lower end thereof, a valve seat surrounding the upper end of said opening, a second transverse plate in said case nipple proximate its upper end, seal means between the upper end of said case nipple and the lower end of said eduction tube, an adjustable valve seat nipple in an axial opening of said second plate, a valve seat upon the lower end of said valve seat nipple, a chamber between said plates, a hermetically sealed metallic bellows in said chamber, said bellows being pressure responsive and having upper and lower end connections, the lower end connection being secured upon an upward extension of said first plate, a valve carrier sleeve surrounding said bellows and adjustably secured to the bellows upper end connection, a valve upon said upper end connection to control the flow of well liquid and pressure fluid from the slug measure into said tube, said valve being normally closed upon the valve seat of said nipple, a valve upon the lower end of said sleeve to control the flow of well liquid from the exterior of said pipe to the interior thereof, said valve being normally open and adapted to engage the valve seat upon said first plate when a predetermined pressure upon the external surface of said bellows compresses the same, said bellows containing a latch and a lubricant, said latch being constructed and arranged to delay and provide snap action for the movements of said valves and said lubricant being adapted to lubricate said latch and limit the compression of said bellows.

13. A well casing, an eduction tube therein, a slug measuring pipe around said tube and extending upward a predetermined distance from the lower end of said tube so as to form an annular slug measure between said pipe and tube, a cap upon the upper end of said pipe, said cap having an internal annular flange engageable upon a coupling of said tube to support said pipe, there being a pressure fluid inlet between the well casing and the interior of the annular slug measure, pressure fluid in said casing, sealing means between said pipe and tube at the lower end of said tube, a first plate in said tube proximately above said sealing means, an annular opening in said plate, a valve seat surrounding the upper end of said opening, a second plate in said tube above said first plate and in spaced relation thereto, an adjustable valve seat nipple in an axial opening of said second plate, a valve seat upon the lower end of said valve seat nipple, a chamber between said plates, a hermetically sealed bellows in said chamber, said bellows being pressure responsive and having upper and lower end connections, the lower end connection being secured upon an upward extension of said first plate, a valve carrier sleeve surrounding said bellows and adjustably secured to the bellows upper end connection, a valve upon said upper end connection to control the flow of well liquid and pressure fluid from the slug measure into said tube, said valve being normally closed upon the valve seat of said nipple, a valve upon the lower end of said sleeve to control the flow of well liquid from the exterior of said pipe to the interior thereof, said valve being normally open and adapted to engage the valve seat upon said first plate when a predetermined pressure upon the external surface of said bellows compresses the same, said bellows containing a latch and a lubricant, said latch being constructed and arranged to delay and provide snap action for the movements of said valves and said lubricant being adapted to lubricate said latch and limit the compression of said bellows, a second pressure responsive element in the eduction tube above said bellows in said chamber, said second bellows being hermetically sealed and adjustably connected into a sleeve, said sleeve being secured to said tube and having an opening communicating with the casing for the admission of pressure fluid, a control valve movable by said bellows, said valve normally closing said opening, and another opening in said sleeve adapted to admit liquid from said tube to contact the bellows for the purpose of compressing it and opening said valve to aerate and expel liquid in the eduction tube above it.

14. A well producing device comprising the combination of, an eduction tube, a pipe of relatively large diameter adapted to receive a predetermined quantity of well liquid, means for supplying a pressure fluid to the exterior of said eduction tube and said pipe, means for admitting the quantity of liquid to the interior of said pipe, means for transferring said liquid from the pipe to the eduction tube, whereby the form of said transferred liquid is lengthened in order to improve gas-liquid ratios in expelling liquids from wells, and a pressure responsive element having two valves adapted to control the alternate admission of well liquid into said large diameter tube and thereafter to transfer said liquid into the eduction tube with pressure fluid following said liquid to expel it through the eduction tube.

15. In a device for removing liquids from a well provided with an eduction tube for such liquids the combination of, means for applying a pressure fluid in the annular space about the eduction tube, means for segregating a quantity of well liquid at a predetermined level within the well, said last mentioned means comprising a chamber about the eduction tube, means operable by the combined pressure of the segregated liquid and the pressure fluid in the chamber for admitting the segregated fluid and a quantity of the pressure fluid to the eduction tube, and means for terminating the flow of the fluids to the eduction tube when the pressure thereof reaches a predetermined lower value.

ALEXANDER BOYNTON.